Sept. 11, 1923.                J. D. TRETHAWAY                1,467,660
                                   WHEEL
                              Filed Feb. 20. 1922
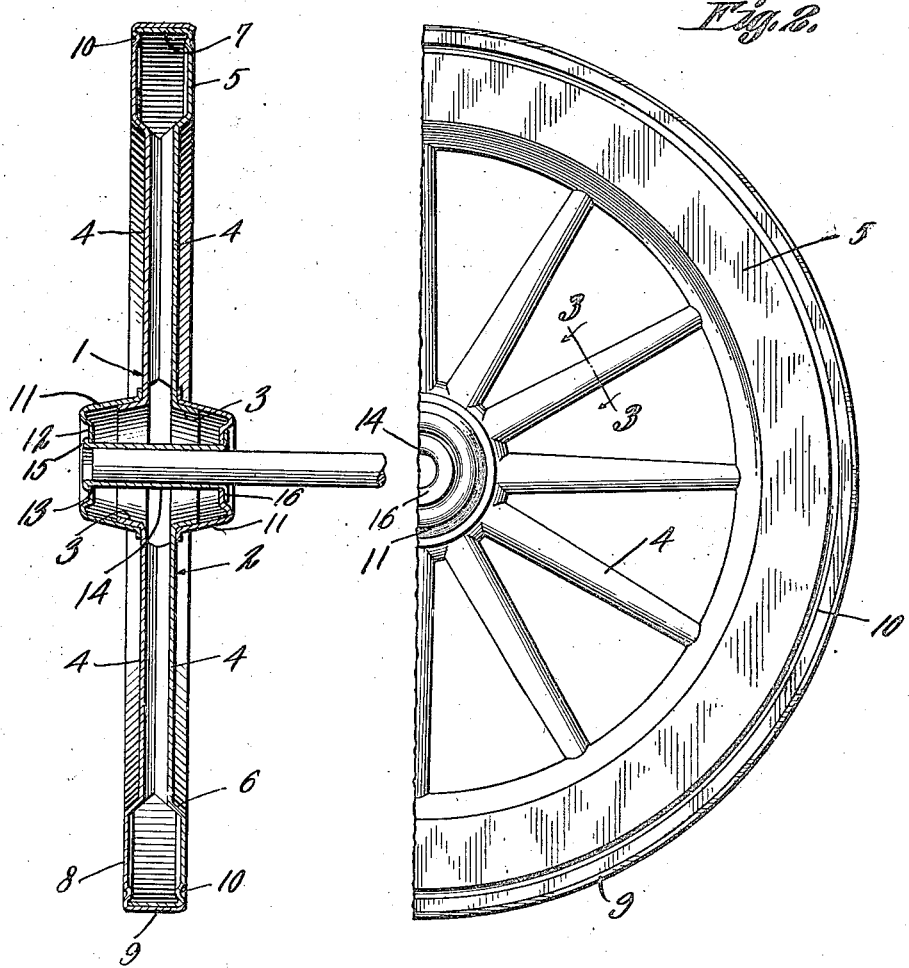

Patented Sept. 11, 1923.

1,467,660

UNITED STATES PATENT OFFICE.

JOSEPH D. TRETHAWAY, OF WILKES-BARRE, PENNSYLVANIA, ASSIGNOR TO TRETHAWAY MFG. COMPANY, OF NEWARK, NEW JERSEY.

WHEEL.

Application filed February 20, 1922. Serial No. 537,960.

*To all whom it may concern:*

Be it known that I, JOSEPH D. TRETHAWAY, a citizen of the United States, residing at Wilkes-Barre, in the county of Luzerne and State of Pennsylvania, have invented a new and useful Wheel, of which the following is a specification.

This invention relates to wheels made of sheet metal and designed primarily for use in the manufacture of toys.

One of the objects of the invention is to provide a wheel made up primarily of two oppositely disposed members stamped from sheet metal and which, when assembled, form the rim and spokes of the wheel.

A further object is to provide a novel form of hub made up of sheet metal members held assembled by a central sleeve or axle engaging member which, when secured in place, constitutes a means for holding the several parts of the wheel assembled.

A further object is to provide a wheel which can be assembled without soldering or using flattened wires or the like, the means employed in the present instance for holding the parts together being neat and rigid.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a central transverse section through the wheel.

Figure 2 is a side elevation of a portion of the wheel.

Figure 3 is an enlarged section on line 3—3, Figure 2.

Referring to the figures by characters of reference 1 and 2 designate opposed members of the wheel, each being stamped from sheet metal and having a central outwardly extending frusto-conical hub portion 3. From this hub portion radiate spoke members 4 which are arcuate in cross section as shown in Figure 3 so as to cooperate for the purpose of forming a complete spoke.

The outer ends of the spoke members 4 are formed integral with the respective rim portions of the wheel. The rim portion 5 of the wheel section or member 2 is in the form of a flat ring having an inner annular flange 6 from which the spoke members 4 extend and an outer annular flange 7. The other rim member 8 of the wheel is similar to the member 5 but its outer annular flange 9 is adapted to lap and fit snugly upon the flange 7, thus to form the tire of the wheel. For the purpose of stiffening the rim members 5 and 8 and rendering the same more attractive, grooves 10 can be formed in the outer faces of the members close to the outer flanges 7 and 9.

For the purpose of holding the parts of the wheel properly assembled metal caps 11 are placed on the respective hub portions 3 so as to fit snugly thereon, each of these caps having its outer end portion formed with a depression 12 in the center of which is provided an opening 13. A metal sleeve or elongated eyelet 14 is inserted through the openings 13 so that the head 16 which is in the form of an annular flange, will rest against one of the caps. The other end of the sleeve or eyelet is then upset as shown at 15 with the result that the parts of the wheel are held together securely without the use of solder or other special fastening means. Furthermore the rim portion of the wheel can be held together by clinching the flanges 7 and 9, as shown.

It is preferred to make the axle of slightly greater diameter than the passage within the eyelet so that by forcing the axle into the eyelet the wheel will be fastened securely to the hub without requiring special fastening means.

By providing the tapered outstanding portion 3 on the members of the wheel the caps 11 will be centered thereby and will be held against relative rotation because of their frictional engagement with said portions.

In will be noted that the wheel is strong, compact and attractive and can be cheaply manufactured.

What is claimed is:—

A wheel consisting of opposed sheet metal members each including a central concentric frusto-conical portion extending laterally, spoke sections projecting radially, an annular rim portion, the two sheet metal members being disposed with their spoke sections and rim portions in contact, frusto-conical cups surrounding and frictionally engaging the hub portions 3 and having apertured recessed outer ends, a sleeve seated within the apertures and having its ends upset, said sleeve constituting means for holding the cups assembled with the hub portions and for binding the spoke sections together.

In testimony that I claim the foregoing as my own, I have hereunto affixed my signature in the presence of two witnesses.

JOSEPH D. TRETHAWAY.

Witnesses:
GEORGE B. ASHLEY,
JOHN TRETHAWAY.